United States Patent [19]
Sokolowska et al.

[11] Patent Number: 5,418,360
[45] Date of Patent: May 23, 1995

[54] SERIAL OPTICAL SIGNAL DISTRIBUTION SYSTEM AND METHOD, AND OPTICAL/ELECTRICAL CONVERTER FOR IMPLEMENTATION THEREOF

[75] Inventors: Ewa Sokolowska, Verdun; Bozena Kaminska, Montréal, both of Canada

[73] Assignee: Ecole Polytechnique, Montreal, Canada

[21] Appl. No.: 184,284

[22] Filed: Jan. 21, 1994

[51] Int. Cl.⁶ .......................... G02B 6/26; G06F 13/00
[52] U.S. Cl. .................... 250/227.12; 385/39; 385/88; 371/1
[58] Field of Search .......... 250/227.12, 227.24, 250/227.28, 214 LS; 385/39, 88, 89, 90, 91; 359/158, 173, 195, 135, 138, 140; 372/8, 25, 700; 371/1; 377/102

[56] References Cited

U.S. PATENT DOCUMENTS

| | | | |
|---|---|---|---|
| 4,959,540 | 9/1990 | Fan et al. | 250/227.12 |
| 5,099,471 | 3/1992 | Tsukada et al. | 250/227.12 |
| 5,293,626 | 3/1994 | Priest et al. | 385/39 |
| 5,339,186 | 8/1994 | Weverka | 250/227.12 |

OTHER PUBLICATIONS

"Distributed Computing with High-Speed Optical Networks" R. J. Vetter & D. H. C. Du, Feb. 1993 IEEE pp. 8–18.

*Primary Examiner*—David C. Nelms
*Assistant Examiner*—John R. Lee
*Attorney, Agent, or Firm*—Merchant & Gould, Smith, Edell, Welter & Schmidt

[57] ABSTRACT

A serial optical signal distribution system and method uses first and second coextending optical waveguides. First and second trains of light pulses are propagated through the first and second optical waveguides, respectively. A series of first delay lines are distributed along the first waveguide for delaying the first train of light pulses, while a series of second delay lines are distributed along the second waveguide for delaying the second train of light pulses. Optical/electrical converters are distributed along the first and second optical waveguides for receiving a fraction of the delayed first train of light pulses from one of the first delay lines and a fraction of the delayed second train of light pulses from a corresponding one of the second delay lines for producing in response thereto a train of electric pulses. Each optical/electrical converter comprises a positive power supply line, a negative power supply line, an output line for delivering the train of electric pulses, a first photosensitive element connected between the positive power supply line and the output line, a second photosensitive element connected between the output line and the negative power supply line, a first optical waveguide for supplying to the first photosensitive element the delayed first train of light pulses, and a second optical waveguide for supplying to the second photosensitive element the delayed second train of light pulses, a capacitive load being connected between the output line and the negative power supply line.

17 Claims, 6 Drawing Sheets

SERIAL OPTICAL SIGNAL DISTRIBUTION SYSTEM AND METHOD, AND OPTICAL/ELECTRICAL CONVERTER FOR IMPLEMENTATION THEREOF

BACKGROUND OF THE INVENTION

1. Field of the Invention

The present invention relates to a serial optical signal distribution system and method for superfast architectures (VLSI), protected against timing problems related to waveform distortions.

The present invention also relates to an optical/electrical converter for implementing the serial optical signal distribution system, and capable of generating an electric signal, in particular but not exclusively an electric clock signal, in response to two trains of light pulses. The leading edges of the light pulses of the first train correspond to the leading edges of the pulses of the electrical signal. The leading edges of the light pulses of the second train correspond to the trailing edges of the pulses of the electrical clock pulses.

2. Brief Description of the Prior Art

The speed of state-of-art VLSI circuits and systems is limited primarily by their interconnects. In particular, clock timing constraints introduce the most critical limitations for the performance of VLSI circuits and systems. Usually, several clock signals, derived from a single master clock and often characterized by a high fan-out, arrive at different, sometimes distant locations. Obviously, the VLSI circuits or systems will not operate satisfactorily if the phase between the same clock signals arriving at different locations varies, and if phase differences between different clock signals are unstable.

With increasing clock frequency, clock skew caused by variation in propagation time through passive and active elements of the VLSI circuits or systems, increases. The contribution of the active elements to clock skew results from the variations of many technological parameters as well as from the variations of thresholds, power supply voltage, temperature, etc. The contribution of the passive elements to clock skew includes signal distortions in electrical transmission lines due to reflections, crosstalk, phase dispersion, and ground loop impedance.

Clock skew, from both origins, can be if not completely eliminated, greatly reduced if the clock signals are distributed through optical links, while keeping electrical interconnection lines as short as possible, and by eliminating reshaping of the electric clock signal.

The non-conductive nature of optical waveguides eliminates many of the above mentioned problems associated with conductive transmission lines. Introduction of optical waveguides therefore improve immunity of the circuits or systems to the above mentioned effects. For that reason, several optical clock distribution architectures have been proposed in the past.

An excellent optical clock distribution architecture for high-performance computer system is presented in U.S. Pat. No. 4,959,540 (Fan et al.) issued on Sep. 25, 1990. To produce clock signals having a predetermined frequency, pulse width and relative phase, Fan et al. use a remote laser clock generator to produce a train of ultrashort pulses. The laser pulses are propagated through an optical fiber, and then equally divided into 2N optical fibers by means of a beam splitter. The optical fibers have different lengths, resulting in different propagation times of the optical pulses. The delayed optical trains of laser pulses are grouped in pairs, and each pair is converted to a corresponding train of short electrical pulses by means of a bistable (toggle) element.

The major disadvantage of the architecture of Fan et al. is that the optical signals are transmitted in parallel, which results in a huge number of optical waveguides which have to be coupled for example to an integrated circuit (IC) or a multichip module (MCM). Another disadvantage is the number of connections necessary between the laser clock generator and the IC or MCM.

OBJECTS OF THE INVENTION

An object of the present invention is therefore to provide a serial optical signal distribution system and method which eliminate the above described drawbacks of the prior art.

Another object of the present invention is to provide a monolithically integrated optical/electrical converter, requiring no amplifiers or toggle circuits, for implementing the serial optical signal distribution system and method.

SUMMARY OF THE INVENTION

In accordance with the present invention, there is provided a serial optical signal distribution system comprising first and second, generally coextending optical waveguide means, first means for supplying the first optical waveguide means with a first train of light pulses propagated through this first waveguide means, second means for supplying the second optical waveguide means with a second train of light pulses propagated through this second waveguide means, a series of first pulse delaying means distributed along the first waveguide means for delaying the propagated first train of light pulses, a series of second pulse delaying means distributed along the second waveguide means for delaying the propagated second train of light pulses, and means distributed along the first and second, generally coextending optical waveguide means for producing trains of electric pulses each in response to the delayed trains of pulses from two of the above mentioned first and second pulse delaying means.

Also in accordance with the present invention, there is provided a serial optical signal distribution method comprising the steps of supplying a first optical waveguide means with a first train of light pulses propagated through the first waveguide means, supplying a second train of light pulses to a second optical waveguide means coextending with the first optical waveguide means, the second train of light pulses propagated through the second waveguide means, delaying the propagated first train of light pulses by means of a series of first pulse delaying means distributed along the first optical waveguide means, delaying the propagated second train of light pulses by means of a series of second pulse delaying means distributed along the second optical waveguide means, and producing trains of electric pulses each in response to the delayed trains of pulses from two of the above mentioned first and second pulse delaying means.

As the signal distribution system and method of the invention are serial, only two optical waveguides are required to distribute the signal at a plurality of different distant locations.

In accordance with preferred embodiments:

the first and second pulse delaying means are arranged into a series of pairs each including one of the first pulse delaying means and one of the second pulse delaying means;

the trains of electric pulses are each produced in response to at least a fraction of the delayed first train of light pulses from the first pulse delaying means of one pair and at least a fraction of the delayed second train of light pulses from the second pulse delaying means of the same pair;

each light pulse of the first and second trains comprises a leading edge, and the electric pulses of each train of electric pulses comprise respective leading edges each corresponding to the leading edge of one light pulse of the delayed first train and respective trailing edges each corresponding to the leading edge of one light pulse of the delayed second train;

supply of the first and second optical waveguide means is carried out by generating a source train of light pulses, supplying a first fraction of the source train of light pulses to the first optical waveguide means, this first fraction of light pulse train constituting the first train of light pulses, and delaying a second fraction of the source train of light pulses to produce the second train of light pulses supplied to the second optical waveguide means;

to form a train of light pulses of higher frequency, at least two delayed trains of pulses are superposed;

to produce each train of electric pulses, the system of the invention uses an optical/electrical converter comprising a positive power supply line, a negative power supply line, an output line for delivering the train of electric pulses, a first photosensitive element connected between the positive power supply line and the output line, this first photosensitive element switching to conduction in response to light, a second photosensitive element connected between the output line and the negative power supply line, this second photosensitive element switching to conduction in response to light, a first optical waveguide for supplying to the first photosensitive element a fraction of the delayed first train of light pulses, and a second optical waveguide for supplying to the second photosensitive element a fraction of the delayed second train of light pulses, wherein a capacitive load is connected between the output line and the negative power supply line.

The objects, advantages and other features of the present invention will become more apparent upon reading of the following non restrictive description of preferred embodiments thereof, given by way of example only with reference to the accompanying drawing.

DETAILED DESCRIPTION OF THE PREFERRED EMBODIMENTS

Figure 1:
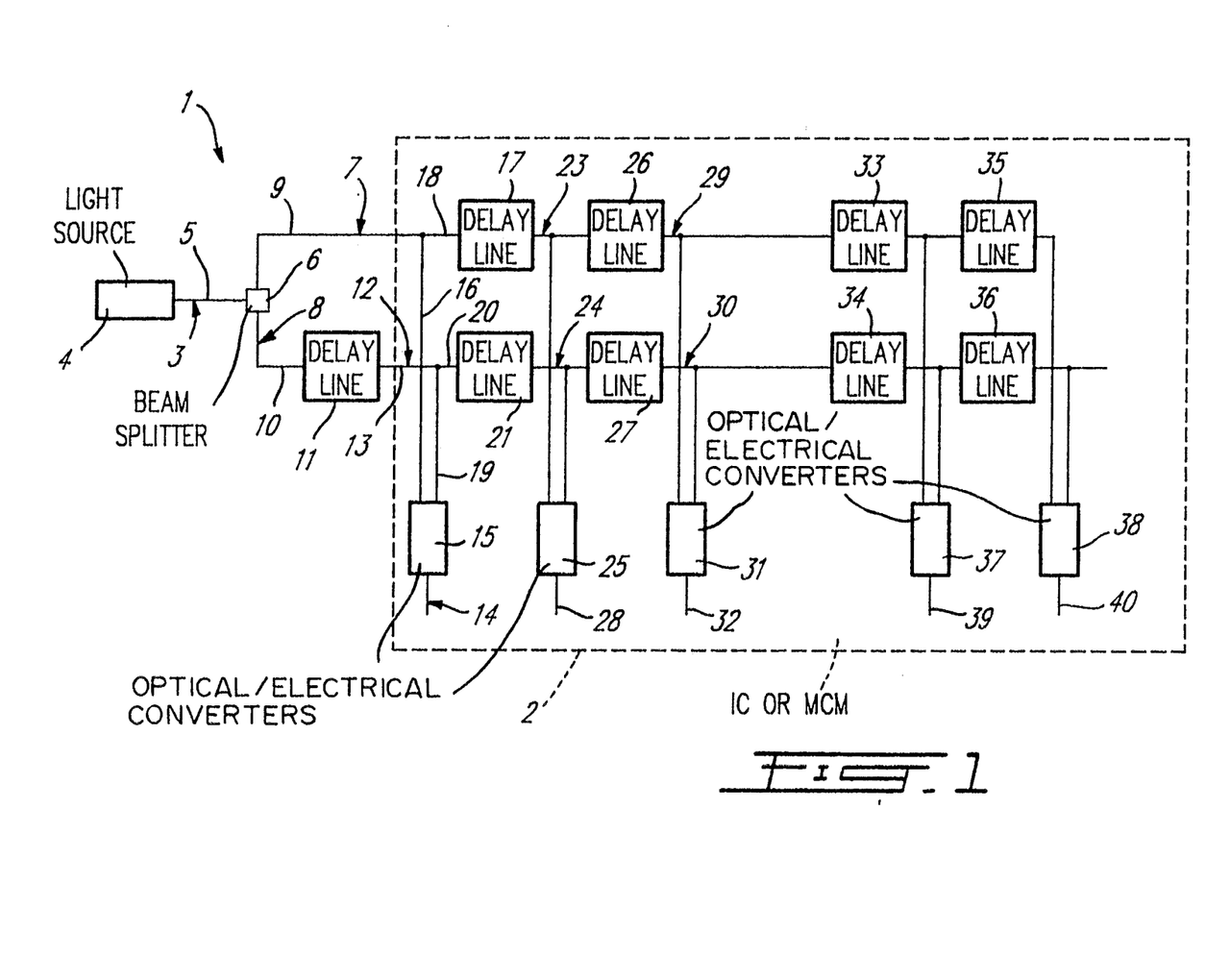
FIG. 1 is a block diagram of a serial optical distribution system in accordance with the present invention, for distributing a clock signal or other global information signal.

Referring now to the appended drawings, FIG. 1 is a block diagram of a serial optical signal distribution system in accordance with the present invention, generally identified by the reference 1, for distributing a clock signal or any other signals in superfast architectures (VLSI).

In the example of FIG. 1, an integrated circuit (IC), multichip module (MCM), or other circuit 2 operates under the control of a plurality of clock signals or other global information signals (hereinafter referred to as clock signals). As it will become apparent from the following description, the signal distribution system 1 of the invention is at least partly integrated in the circuit 2 and designed to generate and distribute the different clock signals from a single input clock signal.

The serial optical signal distribution system 1 is supplied by a train of short light pulses 3 (FIG. 1) generated by a remote light source 4. For example a train of short light pulses can be produced at high repetition rate or frequency by a laser source. One commonly used technique for generating a train of short laser pulses is the mode-locking. The major advantage of the latter technique is its ability to produce laser pulses with very short rise and fall times; this is essential to generate a high quality square wave. Another popular technique is to use gain-switched diode lasers. Those of ordinary skill in the art will appreciate that other techniques are also available.

The train of short light pulses 3 has a predetermined frequency selected in function of the requirement of the circuit 2 and the intended application. In most of the cases, all the clock signals controlling the circuit 2 will have the same period, but different phases and durations (pulse width), and will be distributed to distant locations. In other situations, some of the clock signals controlling the circuit 2 will have different periods. In the latter case, a slightly modified optical distribution system, presented in FIG. 3, will be used.

Figure 2:
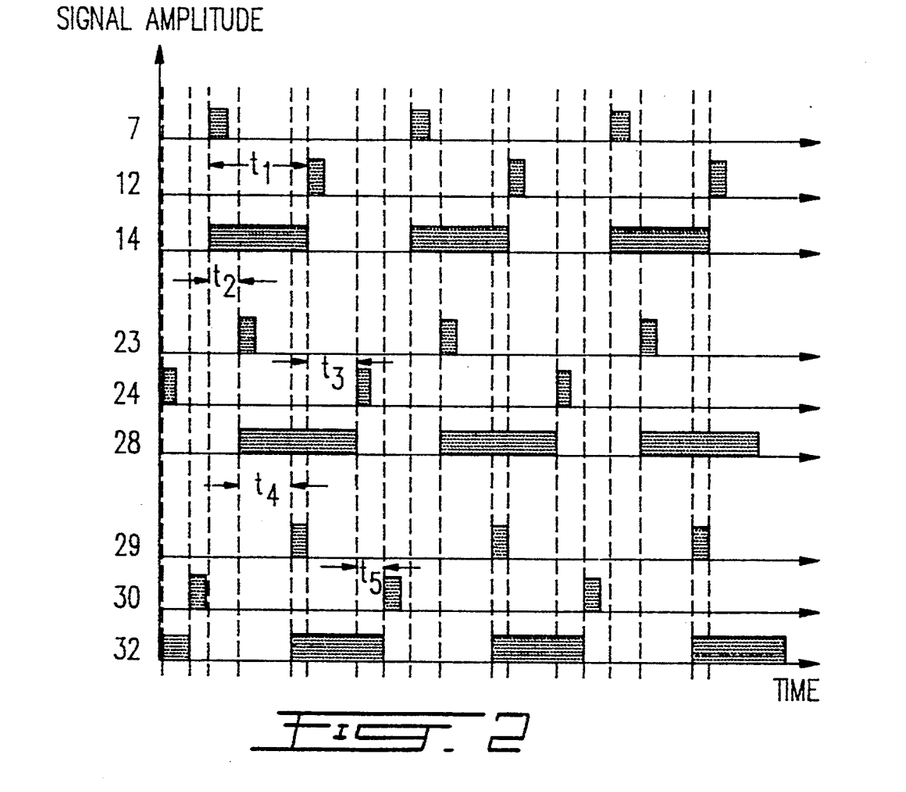
FIG. 2 is a time chart illustrating the operation of the serial optical distribution system of FIG. 1.

Referring back to FIG. 1, the train of light pulses 3 generated by the light source 4 is supplied to an optical waveguide 5, usually an optical fiber, since the light source 4 is situated at a remote location in a majority of implementations. The train of light pulses 3 generated by the light source 4 and propagated through the waveguide 5 is divided by a beam splitter 6 into two equal parts 7 (FIGS. 1 and 2) and 8 propagated through a pair of parallel optical waveguides 9 and 10, respectively. The train of light pulses 8 is delayed by an optical delay line 11, generally constituted by a section of optical fiber to produce a delayed train of light pulses 12 (FIGS. 1 and 2). The train of optical pulses 7 propagating through the waveguide 9, coupled to the circuit 2, represents the leading edges of the pulses of a first clock signal 14 (FIGS. 1 and 2), while the delayed train of light pulses 12 propagating through a waveguide 10, also coupled to the circuit 2, represents the trailing edges of the same clock pulses.

Therefore the light pulses 8 propagating through the optical waveguide 10 are delayed by line 11 for a time period $t_1$ (FIG. 2) corresponding to the width the pulses of the first clock signal 14, that is the duration of the high-level state of this signal 14. A beam splitter (not shown) will transmit a small fraction of the optical power of pulse train 7 to an optical/electrical converter 15 through an optical waveguide 16, the rest of the optical power of pulse train 7 being transmitted to a delay line 17 through an optical waveguide 18. A second beam splitter (not shown) will direct a small fraction of the optical power of pulse train 12 to the optical/electrical converter 15 through an optical waveguide 19, the remaining power of the pulse train 12 being supplied to a delay line 21 through an optical waveguide 20. The optical/electrical converter 15 comprises two inputs for receiving the low power pulse trains from the waveguides 16 and 19, and an output for delivering the clock signal 14. As illustrated in FIG. 2, the leading edges of the pulses of train 7 corresponds to the leading edges of the pulses of train 14, while the leading edges of the pulses of train 12 corresponds to the trailing edges of the pulses of train 14.

The optical/electrical converter 15 will be described hereinafter. However, it should be mentioned that the fractions of optical power supplied to the optical/electrical converter 15 through the optical waveguides 16 and 19 should be sufficient to allow this converter to generate the output clock signal 14.

In the same manner, the light pulses of train 7 propagating through the optical waveguide 18 are delayed by the delay line 17 for a time period $t_2$ (FIG. 2) to produce a delayed train of light pulses 23, while the light pulses of train 12 propagating through the optical waveguide 20 are delayed by the delay line 21 by a time period $t_3$ (FIG. 2) to produce a delayed train of light pulses 24. A beam splitter (not shown) will transmit a small fraction of the optical power of pulse train 23 to an optical/electrical converter 25, the rest of the optical power of pulse train 23 being transmitted to a delay line 26. A second beam splitter (not shown) will direct a small fraction of the optical power of pulse train 24 to the optical/electrical converter 25, the remaining power of the pulse train 24 being supplied to a delay line 27. In response to the two low-power pulse trains, the optical/electrical converter 25 will generate a clock signal 28 (FIGS. 1 and 2). As illustrated in FIG. 2, the leading edges of the pulses of train 23 corresponds to the leading edges of the pulses of train 28, while the leading edges of the pulses of train 24 corresponds to the trailing edges of the pulses of train 28.

Again, the light pulses of train 23 reaching the delay line 26 are delayed for a time period $t_4$ (FIG. 2) to produce a delayed train of light pulses 29, while the light pulses of train 24 reaching the delay line 27 are delayed by a time period $t_5$ (FIG. 2) to produce a delayed train of light pulses 30. A beam splitter (not shown) will transmit a small fraction of the optical power of pulse train 29 to an optical/electrical converter 31, the rest of the optical power of pulse train 29 being transmitted to a delay line 33. Another beam splitter (not shown) will direct a small fraction of the optical power of pulse train 30 to the optical/electrical converter 31, the remaining power of the pulse train 30 being supplied to a delay line 34. In response to the two low-power pulse trains supplied thereto, the optical/electrical converter 31 will generate a clock signal 32 (FIGS. 1 and 2). As illustrated in FIG. 2, the leading edges of the pulses of train 29 corresponds to the leading edges of the pulses of train 32, while the leading edges of the pulses of train 30 corresponds to the trailing edges of the pulses of train 32.

In the same manner, the trains of light pulses 29 and 30 are subsequently propagated toward other delay lines such as 33–36, low-power fractions of the delayed pulses deviated toward corresponding optical/electrical converters such as 37–38 to produce clock signals such as 39–40.

As can be appreciated by one of ordinary skill in the art, the clock signals 14, 28, 32, 39 and 40 are produced by means of two optical trains of pulses 7 and 8 propagated through two different optical waveguides and of which propagation is delayed to produce the various clock signals. More specifically, the delays induced in the train of light pulses 7 by the series of delay lines 17, 26, 33 and 35 correspond to the phase differences between the leading edges of the pulses of the clock signals 14, 28, 32, 39 and 40. Concerning the delay induced by the delay line 11 in the train of light pulses 8, it corresponds to the width of the pulses of clock signal 14. Finally, the delays induced in the train of light pulses 12 by the series of delay lines 21, 27, 34 and 36 correspond to the phase differences between the trailing edges of the pulses of the clock signals 14, 28, 32, 39 and 40, these phase differences obviously determining the width of the pulses of the latter clock signals. Of course, in determining the delay induced by the different delay lines one should take into consideration the time of propagation between two consecutive delay lines and the time of propagation between the output of one delay line to the corresponding optical/electrical converter.

Figure 3:
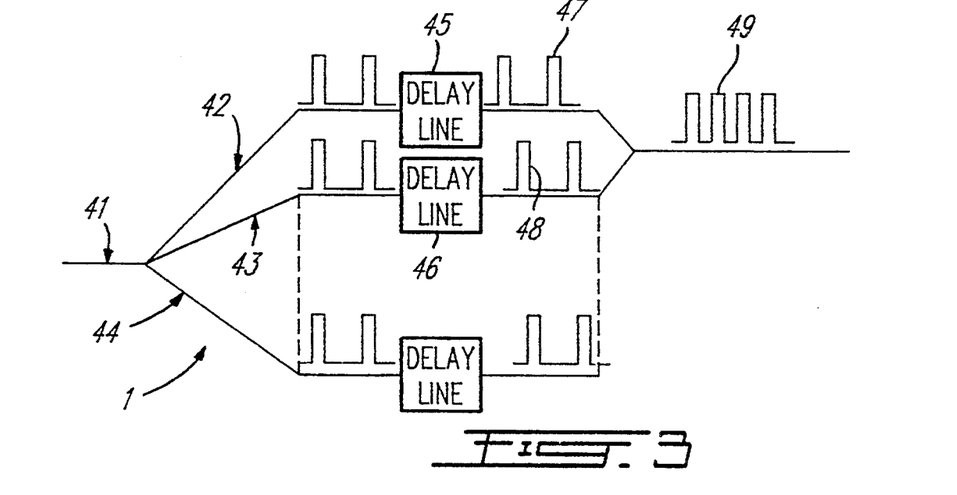
FIG. 3 is a block diagram showing a modified version of the serial optical signal distribution system of FIG. 1, capable of combining delayed trains of light pulses to generate a train of light pulses of higher repetition rate or frequency.

FIG. 3 illustrates a modified version of the serial optical signal distribution system 1 capable of combining the delayed trains of light pulses to generate optical signals having a higher repetition rate or frequency. In the version of FIG. 3, a train of light pulses 41 is split into a plurality of optical waveguides, for example a number n of optical waveguides to form a number n of trains of light pulses such as 42–44. Each train of light pulses 42–44 is delayed by a corresponding delay line; for example the train of light pulses 42 is delayed through a delay line 45 to produce a delayed pulse train 47, and the train of light pulses 43 is delayed by means of a delay line 46 to produce a delayed pulse train 48. If T is the period of the trains of light pulses 42–44, the phase difference between the $i^{th}$ and $i+1^{th}$ pulse trains, for example trains 42 and 43, is T/n. Therefore, combination or superimposition of the delayed trains of light pulses 47 and 48 will produce a train of light pulses 49 of which the frequency is twice that of the trains 47 and 48.

Delay lines such as 11, 17, 21, 26, 27, 33, 34, 35, 36, 45 and 46 may be implemented in the form of passive optical waveguides such as optical fibers, or optical waveguides integrated on the surface of an IC. They may also be constituted by buried optical waveguides integrated in the volume of an IC substrate. Such optical delay lines induce a delay having a fixed value determined by the length of waveguide and the material used for their fabrication. Alternatively, certain delay lines can induce an adjustable delay value; they are externally controlled by at least one parameter. For example, the delay value induced by optical delay lines made of crystals demonstrating an electro-optic effect (Pockel's effect) may be controlled through the intensity of an externally applied electric field.

Therefore the serial optical signal distribution system 1 according to the invention is capable of generating clock signals of adjustable periods, relative phases and durations (pulse width), by propagating an optical signal source (train of light pulses 3) through parallel optical waveguides and by delaying the propagation of the trains of light pulses through these parallel optical waveguides. In the serial optical signal distribution system, the trains of light pulses are serially distributed through the serial delay network (delay lines such as 11, 17, 21, 26, 27, 33, 34, 35 and 36) to all the clock inputs (optical/electrical converters such as 15, 25, 31, 37 and 40). The delay accumulated by the trains of light pulses on their ways through the two series of delay lines provides for the necessary phase shift between subsequent clock signals.

The structure of the optical/electrical converters such as 15, 25, 31, 37 and 38 will now be described with reference to FIGS. 4 to 14.

Figure 4:
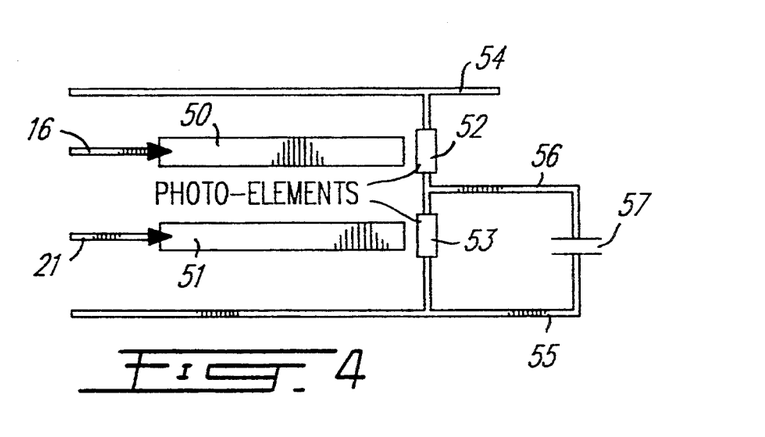
FIG. 4 is the electric equivalent circuit of an optical-/electrical converter used in the serial optical signal distribution system of FIG. 1.

FIG. 4 is an electrical equivalent circuit of the optical/electrical converters. Each optical/electrical converter includes two optical waveguides 50 and 51, two photosensitive elements 52 and 53, a positive power supply line 54, a negative power supply line 55 and an electric output line 56.

In the following description, we will consider that the optical/electrical converter described is optical/electrical converter 15 of FIG. 1. One should however keep in mind that the same explanations apply to the other optical/electrical converters such as 25, 31, 37 and 38 of FIG. 1.

Photosensitive element 52 is connected between the positive power supply line 54 and the electric output line 56. Photosensitive element 53 is connected between the electric output line 56 and the negative power supply line 55. Optical waveguide 50 propagates the light pulses from waveguide 16 (FIG. 1) toward the photosensitive element 52, while optical waveguide 51 propagates the light pulses from waveguide 19 (FIG. 1) toward the photosensitive element 53. Preferably, the photosensitive elements 52 and 53 are Metal-Semiconductor-Metal (MSM) optical switches, phototransistors or photoresistors having a very high resistivity in darkness. However, other types of photosensitive elements can be contemplated provided that, when they are illuminated, they switch on to conduct electric current.

Of course, the electric output line 56 is loaded with one or many input gates, constituting the input of the corresponding section of the circuit 2. The input gates are mainly a capacitive load (57 in FIG. 4) with low leakage current and connected between the electric output line 56 and the negative power supply line 55. When the photosensitive element 52 is illuminated by a light pulse applied thereto, the positive power supply line 54 charges the capacitive load 57 to a desired voltage through the conductive photosensitive element 52 and the negative power supply line 55. As soon as the light pulse applied to the photosensitive element 52 is terminated, photosensitive element 52 is switched off after a small delay but the capacitive load 57 remains charged until a light pulse is applied to the photosensitive element 53. Photosensitive element 53 is then switched on to discharge the capacitive load 57 through the negative power supply line 55.

Figure 5:
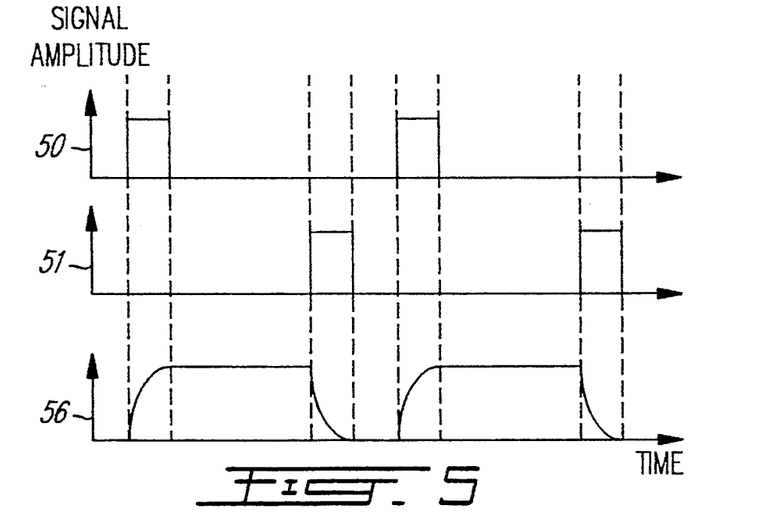
FIG. 5 is a time chart showing the relation between input trains of light pulses and an output train of electric pulses of the optical/electrical converter of FIG. 4.

As shown in FIG. 5, the optical/electrical converter 15 produces an electric pulse train on the output line 56, that is across the capacitive load 57 in response to the light pulse trains propagated through the optical waveguides 50 and 51. More specifically, the leading edge of each electric pulse on output line 56 corresponds to the leading edge of a corresponding light pulse propagating through optical waveguide 50, while the trailing edge of each electric pulse on the output line 56 corresponds to the leading edge of the next light pulse propagating through the optical waveguide 51.

As can be appreciated, the capacitive load 57 is cyclically charged and discharged during the successive periods of conduction of the photosensitive elements 52 and 53. Obviously, the width of the light pulses applied to the photosensitive elements 52 and 53 must be sufficient to ensure complete charging and discharging of the capacitive load during each cycle whereby the electric pulses appearing on the electric output line 56 have the desired amplitude.

The delay between the leading edges of two successive light pulses propagating through the waveguides 50 and 51, respectively, determines the width of the electric pulses on line 56, while the delay between two successive light pulses propagating through the waveguides 51 and 50, respectively, determines the delay between two successive electric pulses.

FIGS. 6-9 are schematic diagrams of optical waveguides (50 and 51) that can be used in the present invention.

Figures 6, 8, 9:
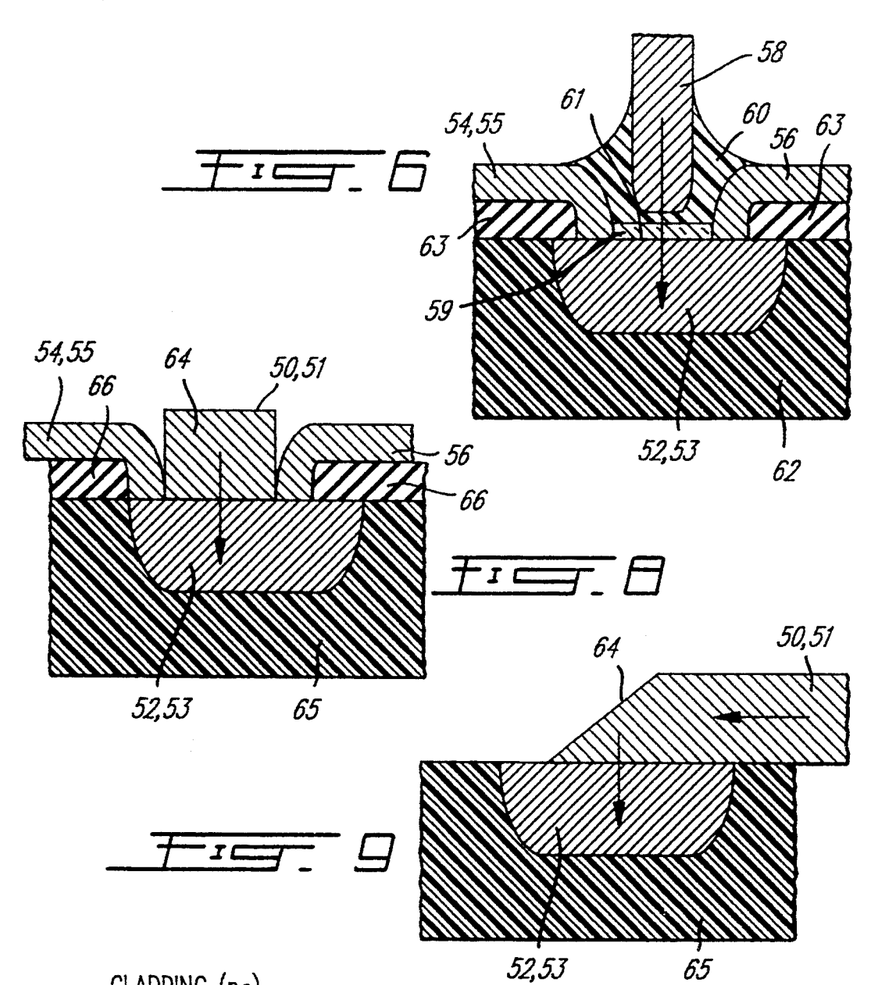
FIG. 6 is a cross sectional view of a first embodiment of optical waveguide usable in the optical/electrical converter of FIG. 4.
FIGS. 7, 8 and 9 are respectively perspective, front cross sectional and elevational, and side cross sectional and elevational views of a second embodiment of optical waveguide usable in the optical/electrical converter of FIG. 4.

In FIG. 6, the waveguide 50,51 is formed by an optical fiber 58, perpendicular to the IC surface and having a proximate end embedded in epoxy resin 60 on the top of photosensitive element 52,53. The top surface 61 of photosensitive element 52,53 is covered with antireflective material 59 to prevent reflection of the light from the optical fiber 58. In the example of FIG. 6, the photosensitive element 52,53 is integrated on a semiconductor substrate 62. Metallic lines 54, 55, 56 are separated from the substrate 62 by a dielectric layer 63.

Figure 7:
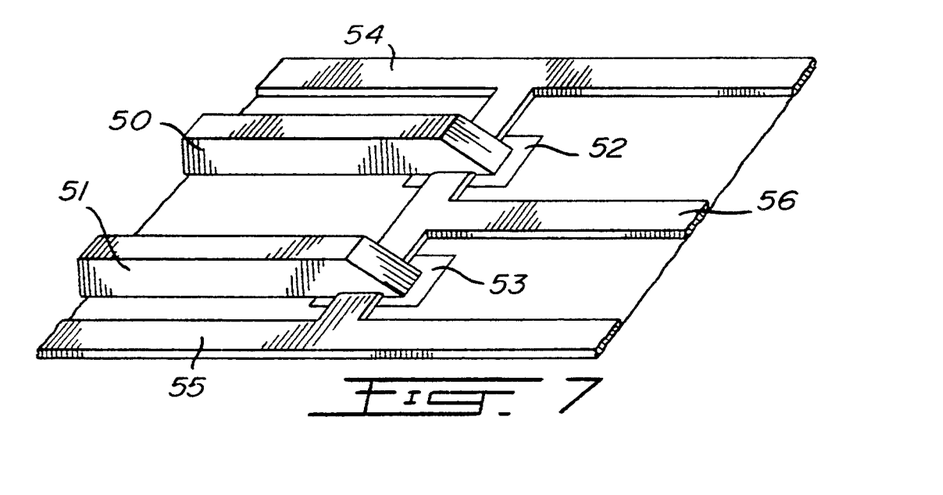

FIGS. 7, 8 and 9 illustrate another example of optical waveguide 50,51. In this embodiment, the waveguides 50 and 51, the photosensitive elements 52 and 53 and the lines 54–56 are implemented on the surface of an integrated circuit. More specifically, the waveguide 50,51 is parallel to the IC surface. It is formed with an angular proximate end forming a reflective surface 64. Therefore light propagated through the waveguide 50,51 is reflected by surface 64 to reach the photosensitive element 52,53 integrated on a semiconductor substrate 65. The metallic lines 54, 55, 56 are separated from the substrate 65 by a dielectric layer 66. The planary processed optical waveguide technology is very wellsuited for constructing this embodiment of FIGS. 7, 8 and 9.

Figure 10:
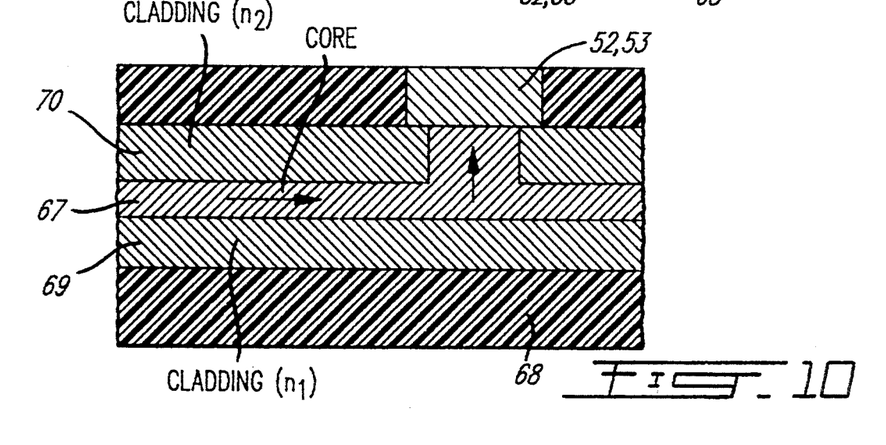
FIG. 10 is a side cross sectional and elevational view of a third embodiment of optical waveguide usable in the optical/electrical converter of FIG. 4.

A structure comprising a buried optical waveguide 50,51 is shown in FIG. 10. This structure is formed on a semi-insulating substrate 68. This waveguide is formed with a core 67, cladding 69 between the substrate 68 and the core 67 and cladding 70 above the core 67. Light will be propagated toward the photosensitive element 52,53 through the core 67. The refraction index $n_0$ for the core 67, the refraction index $n_1$ for the cladding 69, the refraction index $n_2$ for the cladding 70 and the refraction index $n_3$ for the absorbing layer 71 (FIGS. 11 and 12) of the photosensitive element 52,53 follow the following relation:

$$n_0 < n_1 \text{ and } n_2 < n_3$$

Figure 11:
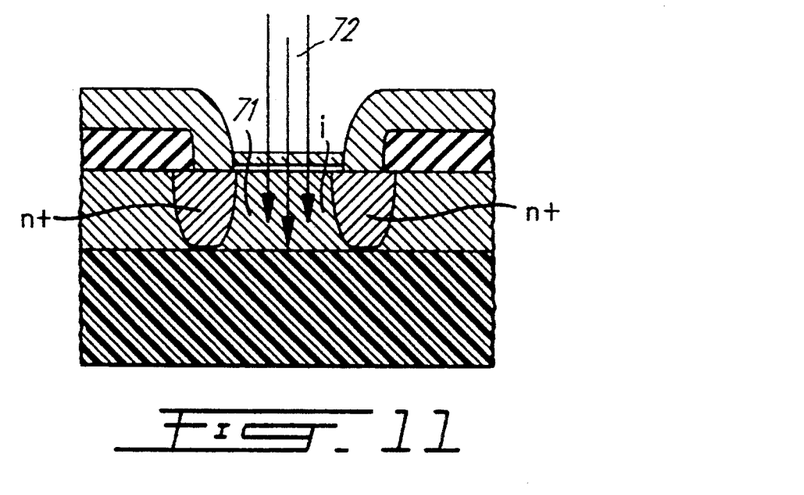
FIG. 11 is a side cross sectional and elevational view of a first embodiment of resistive photosensitive element usable in the optical/electrical converter of FIG. 4.
Figure 12:
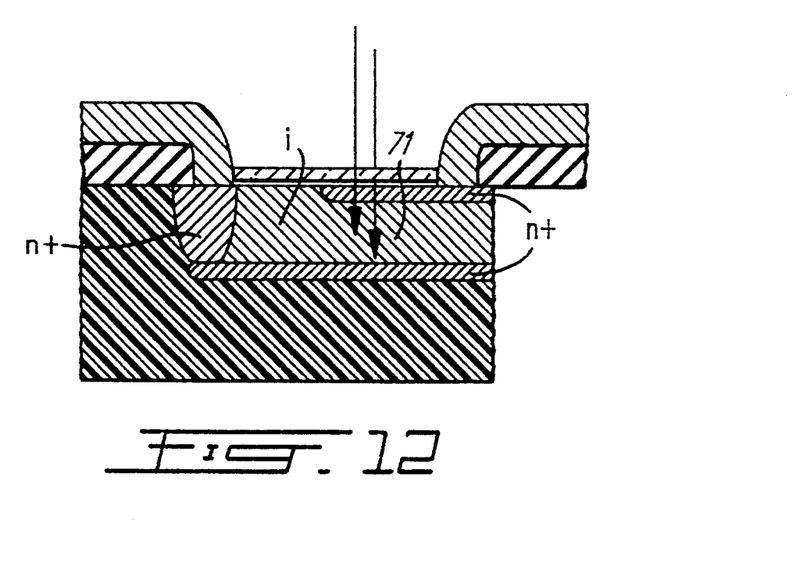
FIG. 12 is a side cross sectional and elevational view of a second embodiment of resistive photosensitive element usable in the optical/electrical converter of FIG. 4.
Figure 13:
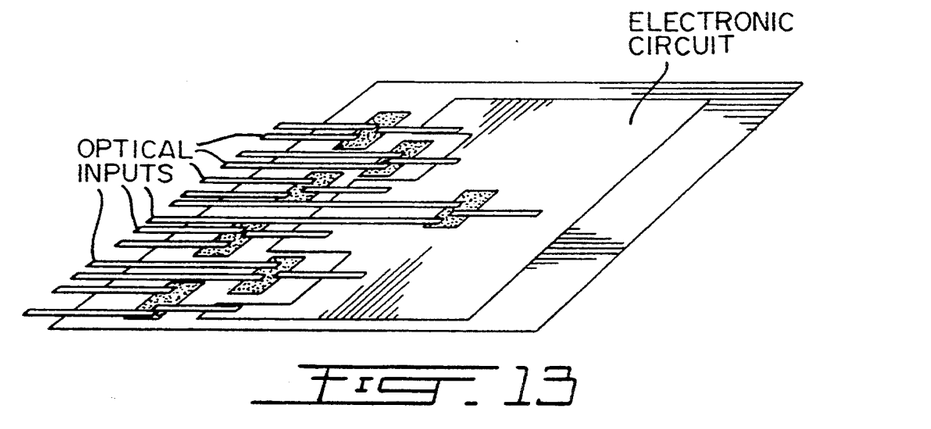
FIG. 13 is a perspective view of an integrated circuit containing an optical input port formed by a plurality of optical/electrical converters according to FIGS. 7, 8 and 9.
Figure 14:
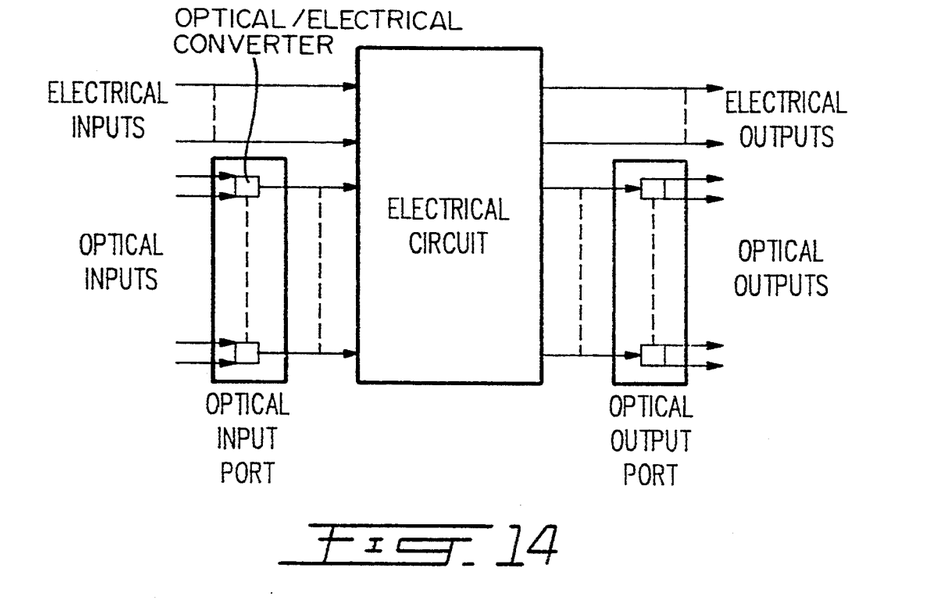
FIG. 14 is a schematic block diagram of an integrated circuit containing optical input and output port.

Formation of such optical waveguides is possible in quaternary or ternary heterostructures. Several techniques may be used to redirect the optical signal toward the absorbing layer 71 of photosensitive element 52,53, while the design of the photosensitive elements may differ from one technology to another. As a non-limitative example, a photoresistor (n+in+ or p+ip+ structure) is shown in FIGS. 11 and 12. More specifically, a cross sectional view of a horizontal photoresistor structure with vertical fibers 72 is shown in FIG. 11, and a vertical photoresistor is shown in FIG. 12. However, as mentioned in the foregoing description it is within the scope of the present invention to use other photosensitive elements such as Metal-Semiconductor-Metal (MCM) optical switches or phototransistors instead of photoresistors.

The above described optical/electrical converter can be placed very close to the active electrical device, thereby eliminating the timing problems caused by transmission lines. A plurality of such converters, integrated with an electrical or electronic circuit on the same substrate, forms an optical input port, schematically shown in FIGS. 13 and 14.

The proposed technique for the optical distribution of digital signals is very powerful for high speed integrated circuits (IC's), as well as for the multichip modules (MCM's) containing integrated circuits with optical ports.

The serial optical signal distribution system 1, including optical/electrical converters according to FIG. 4 presents, amongst others, the following advantages:

the only delay between the incoming light pulses and the leading and trailing edges of the generated electric clock pulses is caused by the photosensitive element 52 or 53; there is no additional delay caused by cascaded photosensitive elements with amplifiers;

there is no power dissipation, except during the conduction periods of the photosensitive elements and the time periods in which the input gates of the IC or MCM are switched;

the skew between the electric signals arriving at distant input gates after decoding thereof by the optical-/electrical converters is eliminated;

when a multitude of gates have to be switched with a same electric signal, the optical signal may be split into a plurality of waveguides coupled to a plurality of optical/electrical converters, each of which being mounted close to the corresponding electrical input gate to be switched; this arrangement eliminates the long electric transmission lines otherwise necessary for signal distribution;

the skew related to optical transmission is mostly negligible, and the skew caused by the differences in charging/discharging time constants between different gates may be eliminated by adjusting the dimensions of the photosensitive elements and the optical signal power;

the widths of the pulses and the delay between successive pulses of the electric signal are adjustable through the specific delays between the light pulses;

the optical waveguides can be deposited on the same substrate as the optical/electrical converters and the integrated circuit, thus facilitating encapsulation;

distribution of a signal through a serial network ensures an exact timing, simultaneously enabling extremely compact integrated implementation, with dramatically shorter and fewer optical waveguides whereby the savings in chip area occupied by the waveguides are enormous;

the physical distance separating inputs of different clock signals is employed profitably, i.e. any distant locations along the serial network of delay lines can be supplied with a clock signal (a single pair of optical path is required for that purpose);

the minimal number of connections necessary for coupling the optical signals to IC's or MCM's is greatly reduced;

the basic period of clock signals is adjustable and controlled through the light source (laser), while the duration and phase of the various clock signals is adjustable through delay lines forming part of the serial network.

Although the present invention has been described in the foregoing description by way of preferred embodiments thereof, these embodiments can be modified at will within the scope of the appended claims without departing from the spirit and nature and of the subject invention.

What is claimed is:

1. A serial optical signal distribution system comprising:

first and second, generally coextending optical waveguide means;

first means for supplying the first optical waveguide means with a first train of light pulses propagated through said first waveguide means;

second means for supplying the second optical waveguide means with a second train of light pulses propagated through said second waveguide means;

a series of first pulse delaying means distributed along the first waveguide means for delaying said propagated first train of light pulses;

a series of second pulse delaying means distributed along the second waveguide means for delaying said propagated second train of light pulses; and means distributed along said first and second, generally coextending optical waveguide means for producing trains of electric pulses each in response to the delayed trains of pulses from two of said first and second pulse delaying means.

2. A serial optical signal distribution system as recited in claim 1, in which said means for producing trains of electric pulses comprises optical/electrical converters distributed along said first and second optical waveguide means, each optical/electrical converter receiving at least a fraction of the delayed first train of light pulses from one of said first pulse delaying means and at least a fraction of the delayed second train of light pulses from one of said second pulse delaying means, for producing in response thereto a corresponding one of said trains of electric pulses.

3. A serial optical signal distribution system as recited in claim 1, in which said first and second pulse delaying means are arranged into a series of pairs of pulse delaying means each including one of said first pulse delaying means and one of said second pulse delaying means.

4. A serial optical signal distribution system as recited in claim 3, in which said means for producing trains of electric pulses comprises optical/electrical converters distributed along said first and second optical waveguide means, each optical/electrical converter receiving at least a fraction of the delayed first train of light pulses from the first pulse delaying means of one of said pairs and at least a fraction of the delayed second train of light pulses from the second pulse delaying means of said one pair, for producing in response thereto a corresponding one of said trains of electric pulses.

5. A serial optical signal distribution system as recited in claim 2, in which each light pulse of said first and second trains comprises a leading edge, and in which the electric pulses produced by each optical/electrical converter comprise respective leading edges each corresponding to the leading edge of one light pulse of the delayed first train and respective trailing edges each corresponding to the leading edge of one light pulse of the delayed second train.

6. A serial optical signal distribution system as recited in claim 1, in which said first and second supplying means comprise:
   a light source for generating a train of light pulses;
   means for supplying a first fraction of the train of light pulses from the light source to the first optical waveguide means, said first fraction of light pulse train constituting said first train of light pulses;
   means for delaying a second fraction of the train of light pulses from the light source to produce said second train of light pulses; and
   means for supplying said delayed second fraction of the train of light pulses to the second optical waveguide means.

7. A serial optical signal distribution system as recited in claim 1, comprising at least three generally coextending optical waveguide means, means for supplying a train of light pulses to each of said optical waveguide means, means for delaying the train of light pulses propagated through each optical waveguide means, and means for superposing at least two of said delayed trains of pulses to form a train of light pulses of higher frequency.

8. A serial optical signal distribution system as recited in claim 1, comprising means for superposing the delayed train of light pulses from one of said first and second pulse delaying means with the delayed train of light pulses from another one of said first and second pulse delaying means to form a train of light pulses of higher frequency.

9. A serial optical signal distribution system as recited in claim 2, wherein each optical/electrical converter comprises:
   a positive power supply line;
   a negative power supply line;
   an output line for delivering the train of electric pulses;
   a first photosensitive element connected between the positive power supply line and the output line, said first photosensitive element switching to conduction in response to light;
   a second photosensitive element connected between the output line and the negative power supply line, said second photosensitive element switching to conduction in response to light;
   a first optical waveguide for supplying to the first photosensitive element said at least a fraction of the delayed first train of light pulses; and
   a second optical waveguide for supplying to the second photosensitive element said at least a fraction of the delayed second train of light pulses;
   wherein a capacitive load is connected between said output line and said negative power supply line.

10. A serial optical signal distribution method comprising the steps of:
   supplying a first optical waveguide means with a first train of light pulses propagated through said first waveguide means;
   supplying a second train of light pulses to a second optical waveguide means coextending with said first optical waveguide means, the second train of light pulses propagated through said second waveguide means;
   delaying the propagated first train of light pulses by means of a series of first pulse delaying means distributed along the first optical waveguide means;
   delaying the propagated second train of light pulses by means of a series of second pulse delaying means distributed along the second optical waveguide means; and
   producing trains of electric pulses each in response to the delayed trains of pulses from two of said first and second pulse delaying means.

11. The serial optical signal distribution method of claim 10, wherein said electric pulse train producing step comprises producing trains of electric pulses each in response to at least a fraction of the delayed first train of light pulses from one of said first pulse delaying means and at least a fraction of the delayed second train of light pulses from one of said second pulse delaying means.

12. The serial optical signal distribution method of claim 10, comprising arranging said first and second pulse delaying means into a series of pairs each including one of said first pulse delaying means and one of said second pulse delaying means.

13. The serial optical signal distribution method of claim 12, wherein said electric pulse train producing step comprises producing trains of electric pulses each in response to at least a fraction of the delayed first train of light pulses from the first pulse delaying means of one of said pairs and at least a fraction of the delayed second train of light pulses from the second pulse delaying means of said one pair.

14. The serial optical signal distribution method of claim 11, wherein each light pulse of said first and second trains comprises a leading edge, and wherein the electric pulses of each train of electric pulses comprise respective leading edges each corresponding to the leading edge of one light pulse of the delayed first train and respective trailing edges each corresponding to the leading edge of one light pulse of the delayed second train.

15. The serial optical signal distribution method of claim 10, wherein said supplying steps comprise:
   generating a source train of light pulses;
   supplying a first fraction of the source train of light pulses to the first optical waveguide means, said first fraction of light pulse train constituting said first train of light pulses;

delaying a second fraction of the source train of light pulses to produce said second train of light pulses; and supplying said delayed second fraction of the source train of light pulses to the second optical waveguide means.

16. The serial optical signal distribution method of claim 10, comprising supplying a train of light pulses to at least three generally coextending optical waveguide means, delaying the train of light pulses propagated through each optical waveguide means, and superposing at least two of said delayed trains of pulses to form a train of light pulses of higher frequency.

17. The serial optical signal distribution method of claim 10, comprising superposing the delayed train of light pulses from one of said first and second pulse delaying means with the delayed train of light pulses from another one of said first and second pulse delaying means to form a train of light pulses of higher frequency.

* * * * *